T. J. RUSSELL.
Wood-Boring Machine.
No. 3,776. Patented Oct. 3, 1844.
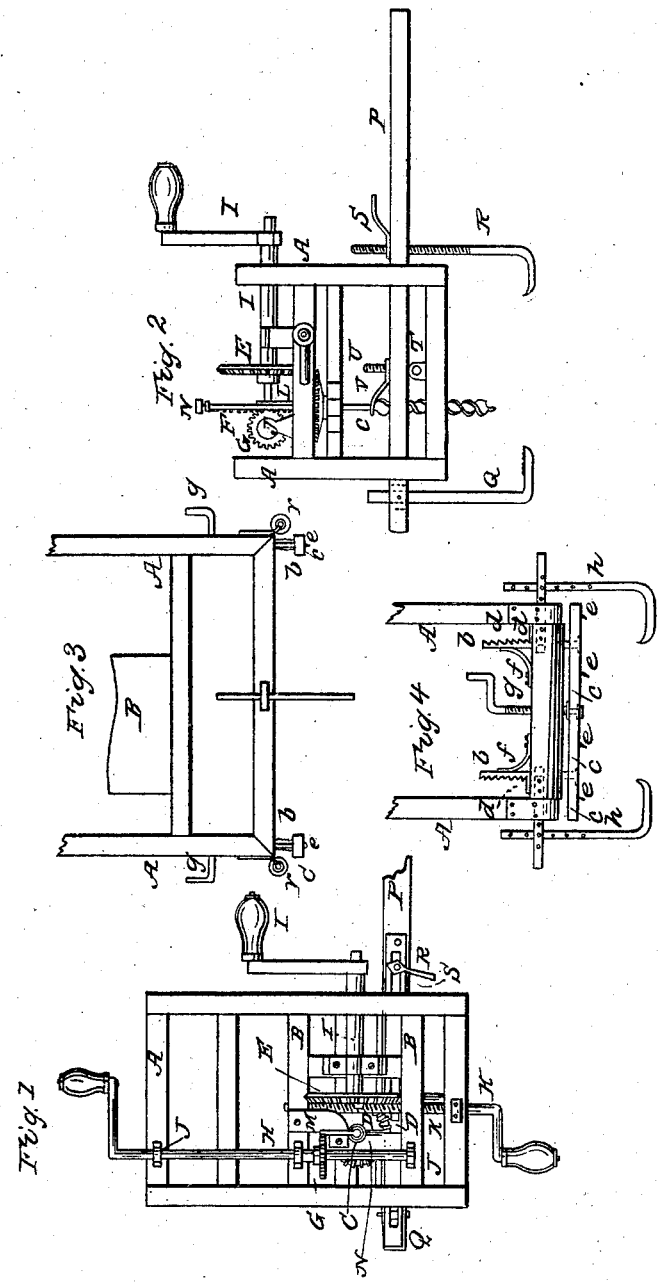

UNITED STATES PATENT OFFICE.

THOMAS J. RUSSELL, OF NEAR FRANKLIN SQUARE, OHIO.

MACHINE FOR BORING TIMBER.

Specification of Letters Patent No. 3,776, dated October 3, 1844.

*To all whom it may concern:*

Be it known that I, THOMAS J. RUSSELL, of near Franklin Square, Columbiana county, State of Ohio, have invented a new and useful Improvement in Machines for Boring, which is described as follows, reference being had to the annexed drawings of the same, making part of this specification.

Figure 1 is a top view of the machine. Fig. 2 is an elevation or end view. Fig. 3 is a side elevation showing the hold fasts and rollers. Fig. 4 is an end elevation showing the hold fast.

In a suitable frame A of convenient size and strength I arrange a sliding frame or carriage B containing the auger C for boring and the horizontal and vertical bevel cog wheels D, E, for turning the auger and a vertical sliding rack F attached to the head of the shank of the auger and a vertical cog wheel $a$ on a crank shaft H for raising and lowering said rack and auger and a crank shaft I for turning the bevel gear for operating the auger and a screw K turned by a crank for moving said carriage back and forth over the article to be bored the said screw turning in a suitable box fixed in the stationary frame, the aforesaid crank shaft H for turning the gearing of the rack also turning in a box or collar and fixed to the frame, the side rails of the frame being grooved on the upper and under sides to admit corresponding tongues on the top and bottom edges of the sides of the carriage, which slide in the grooves in the rails. The hub of the horizontal bevel wheel is perforated through the center with an oval or other shaped apertures to receive the shank of the auger which is made of corresponding size and shape to rise and fall in said aperture without turning horizontally therein. The rack for raising and lowering the auger and attached to the head thereof moves in a vertical rectangular socket projected vertically from a horizontal plate M fastened to the carriage. The top of said rack is turned at right angles and formed into an arm which is perforated at its outer extremity with a round aperture into which is inserted the upper or reduced end of the auger shank on which there is cut the thread of a screw on which a nut is screwed. In order to bore with this machine the frame A must be brought to the timber to be bored and secured thereto by a lever P and two hooks or grips Q, R, made adjustable by holes, pins, mortises, and screws, the fulcrum of said lever being a horizontal vibrating axle T turning in boxes on the sills of the frame from whose upper surface projects a screw shank U that passes through an oblong mortise in the lever having a nut or thumb screw V screwed thereon for attaching said axle to the lever, or the lever to the axle, so that it can be adjusted at pleasure to the article to be bored. The crank shaft I is then turned which operates the bevel gearing D, E, and this turns the auger which bores the hole. The crank shaft H is then turned which operates the rack and raises the auger from the timber. The crank shaft K is then turned which operates the screw that moves the carriage B and auger to the distance required to bore the next hole which is bored in a similar manner; and in this manner the operation is continued until a sufficient number of holes are bored to make a mortise of the length required. The frame A during this operation remains stationary. When it is required to remove the frame the screw S must be turned which disengages the second hook or grips and permits the frame to be removed.

Another mode of securing the frame to the article to be bored so that the frame may be held firmly upon the timber to be bored and the holes be bored at any required angle is by means of a combination of racks, screws, bars, and hooks arranged in the following manner.

To the side sills of the frame A I attach two hooks $h$, Fig. 4, that are to be brought under the timber to be bored and whose shanks are perforated with apertures into which are inserted pins resting on the upper sides of the side sills of the frame. The racks $b$ are placed in a vertical position and pass through oblong mortises in the end sills of the frame having attached to their lower extremities horizontal bars $c$ with points $e$ to prevent slipping that are to rest upon the article to be bored, held at any required height by means of a turning dog $d$ or plate fastened to the upper side of the sills and coming under the teeth of the said racks $b$ curved spring $f$ fastened to the frame being placed against the back of the racks for keeping them in contact with said plates. The aforesaid vertical screws $g$ have cranks on their upper ends and plates or washers on their lower ends which bear upon, or are attached to the said bars, to which the racks are attached; and said screws turning in female screws or burs fixed in the sills of the frame bear down upon said bars upon the article to be bored at the same time causing the frame with the boring tool and hooks to rise therefrom, the hooks $h$ being drawn up hard against the under side of the timber, the aforesaid dogs $d$ in contact with the teeth of the racks $b$ holding what is gained by turning the screws $g$, and in this manner the frame is effectually secured to the timber to be bored and in a manner difficult to separate it therefrom without first reversing the movement of the crank screws and disengaging the dogs from the racks.

When it is required to bore vertical holes the frame must be placed in a horizontal position. And when it is required to bore holes at an angle of inclination of any required number of degrees with the plane of the timber to be bored it is only requisite to set the aforesaid pointed bars at unequal distances from the under sides of the sills to which they are connected and which is conveniently effected by means of the aforesaid racks and screws and this will give the frame A the required inclination.

Anti friction rollers $r$ are arranged under the sills of the frame for rolling the frame from place to place instead of sliding it. When these rollers are used the bars $c$ with points must be raised above the level of the rollers.

What I claim as my invention and which I desire to secure by Letters Patent is—

The combination of the racks $b$, bars $c$, screws $g$ and hooks $h$ for holding the portable frame A containing the boring tool firmly down upon the article to be bored in the manner set forth for boring holes at any required angle with facility and accuracy.

THOMAS J. RUSSELL.

Witnesses:
 Wm. P. Elliot,
 Albert E. Johnson.